(12) United States Patent
Bruening (10) Patent No.: US 9,352,626 B1
(45) Date of Patent: May 31, 2016

(54) MULTI-PURPOSE BOAT

(71) Applicant: Bryan N. Bruening, Saint Cloud, MN (US)

(72) Inventor: Bryan N. Bruening, Saint Cloud, MN (US)

( * ) Notice: Subject to any disclaimer, the term of this patent is extended or adjusted under 35 U.S.C. 154(b) by 0 days.

(21) Appl. No.: 13/849,498

(22) Filed: Mar. 23, 2013

(51) Int. Cl.
  *B60F 3/00* (2006.01)
  *B63H 19/08* (2006.01)

(52) U.S. Cl.
  CPC .................................... *B60F 3/0069* (2013.01)

(58) Field of Classification Search
  CPC .......... B60F 3/00; B60F 3/003; B60F 3/0061; B60F 3/0069
  USPC .................................. 440/12.5, 12.51–12.54
  See application file for complete search history.

(56) References Cited

U.S. PATENT DOCUMENTS

| 583,033 | A | 5/1897 | Danz |
|---|---|---|---|
| 906,261 | A | 12/1908 | Morzinski |
| 917,618 | A | 4/1909 | Lacoste |
| 1,164,817 | A | 12/1915 | Hyde |
| 2,157,186 | A | 5/1939 | Pinter, Sr. et al. |
| 2,214,655 | A | 9/1940 | Briggs |
| 2,473,076 | A | 6/1949 | Scheibner |
| 2,504,833 | A | 4/1950 | Hann |
| 2,664,064 | A | 12/1953 | Prenosil, Sr. |
| 2,823,684 | A | 2/1958 | Sartori |
| 2,910,035 | A | 10/1959 | Johnson |
| 2,994,290 | A | 8/1961 | Merchant, Sr. |
| 3,039,422 | A | 6/1962 | Baker |
| 3,159,134 | A | 12/1964 | Winnen |
| 3,348,874 | A | 10/1967 | Gorman |
| 3,377,976 | A | 4/1968 | Gustine |
| 3,487,802 | A | 1/1970 | Roy |
| 3,638,257 | A | 2/1972 | Ernst |
| 3,755,835 | A | 9/1973 | Boersig |
| 4,106,145 | A | 8/1978 | Gillen et al. |
| 4,494,472 | A | 1/1985 | Rougerie |
| 4,496,325 | A | 1/1985 | Tweg |
| 4,751,936 | A | 6/1988 | Zibble et al. |
| 4,776,295 | A | 10/1988 | Kline et al. |
| D299,123 | S | * 12/1988 | Olafsen ........................ D12/300 |
| 4,844,595 | A | 7/1989 | Nealy |
| 4,891,024 | A | 1/1990 | Benjamin |
| 4,943,251 | A | 7/1990 | Lerach et al. |
| 5,010,835 | A | 4/1991 | Kunitake et al. |
| 5,085,281 | A | 2/1992 | Selly |
| 5,181,478 | A | 1/1993 | Berardi |
| 5,477,875 | A | 12/1995 | Daly, Jr. |
| 5,515,805 | A | 5/1996 | Johanson |
| 5,632,221 | A | 5/1997 | Trenne et al. |
| 5,730,080 | A | 3/1998 | Cripe |
| 5,813,357 | A | 9/1998 | Watson |
| 6,164,238 | A | 12/2000 | Stokes |

(Continued)

OTHER PUBLICATIONS

"Adjacent" and "Immediately", Webster's Nuew Universal Unabridged Dictionary, 1983, pp. 24, 909.

*Primary Examiner* — Daniel V Venne
(74) *Attorney, Agent, or Firm* — Albert W. Watkins (57) ABSTRACT

A multi-purpose boat has both land and water propulsion. The land propulsion wheels are selectively retractable, to lower the boat into engagement with ice. At least one ice fishing portal is provided in the bottom of the boat hull, and a portal cover is coupled with the boat hull to selectively open or close the portal. In some embodiments, a plurality of motive power sources are provided, as are various low-speed rudder systems, and a variety of canopies or shelters for various sporting activities.

16 Claims, 6 Drawing Sheets

(56) References Cited

U.S. PATENT DOCUMENTS

| | | |
|---|---|---|
| 6,165,030 A | 12/2000 | Lewis |
| 6,210,242 B1 | 4/2001 | Howard et al. |
| 6,217,398 B1 | 4/2001 | Davis |
| 6,241,569 B1 | 6/2001 | Harkrider |
| 6,302,043 B1 | 10/2001 | Wippermann |
| 6,374,529 B1 | 4/2002 | Petroski et al. |
| 6,568,344 B2 | 5/2003 | Burlet |
| 6,712,653 B2 | 3/2004 | Free |
| 6,769,379 B2 | 8/2004 | Foiles |
| 6,921,304 B2 | 7/2005 | Hewitt |
| 7,004,801 B2 | 2/2006 | Bryham |
| 7,037,149 B1 | 5/2006 | Mauzy |
| 7,207,852 B2 | 4/2007 | Myers |
| 7,487,734 B2 * | 2/2009 | Davis .......................... 114/61.1 |
| 7,549,902 B2 | 6/2009 | Jansen |
| 7,591,202 B2 | 9/2009 | Grube |
| 7,927,164 B2 | 4/2011 | Kuchler |
| 7,934,963 B1 | 5/2011 | Carambat |
| 2008/0071436 A1 | 3/2008 | Dube et al. |
| 2008/0200079 A1 | 8/2008 | Jansen |
| 2011/0180341 A1 | 7/2011 | Chan |
| 2011/0183805 A1 | 7/2011 | Chan |

* cited by examiner

MULTI-PURPOSE BOAT

BACKGROUND OF THE INVENTION

1. Field of the Invention

This invention pertains generally to boats, and more particularly to multi-purpose boats that have utility on land, in water of all depths, and on partially or completely ice-covered bodies of water such as frozen lakes, ponds, rivers and the like.

2. Description of the Related Art

Most modern boats have utility in moderate to deep waters, but provide little to no utility when a person wishes to access shallow waterways, land or frozen bodies of water. Since most people begin a trip to the water from the land, this necessarily is inconvenient.

In some cases, a boat will be stored in a reasonably safe place along the shore of the water, such as at a private dock, in a larger docking facility, or in a marina or harbor. In these cases, the boat cannot remain if the water freezes, since the forces generated by the ice will damage or destroy most boats. Further, not all docking facilities are adequately sheltered from the weather, meaning the boat will need to be moved over land either seasonally, or irregularly based upon the vagaries of the weather. In other cases, the boat will be stored remotely, such as in a garage or other shelter, and then transported to the water.

Most boats are transported across the land using a trailer sized to support the particular boat. This means that when the boat is in the water, the trailer must be stored separately therefrom, requiring extra space. In addition, extra time is required in retrieving the trailer and again in loading and unloading the boat therefrom. In addition, the boat cannot traverse even the smallest of land sections or shallow bodies of water absent the trailer, meaning even small obstacles or short, shallow sections of water can prevent most boats from passing through. Ice will similarly present an insurmountable obstacle to common boats, since the boats have no means for traveling upon the surface of the ice and since the forces, energy and effort to break up and pass through the ice are too great for most boats.

To improve upon the capabilities of standard boats, various artisans have, over time, developed various boats that are capable of traversing both land and water. Exemplary patents that illustrate boats with integral trailers, the teachings and contents of each which are incorporated herein by reference, include U.S. Pat. No. 2,157,186 by Pinter, Sr. et al, entitled "Convertible trailer-boat"; and U.S. Pat. No. 6,568,344 by Burlet, entitled "Combined boat-trailer apparatus". These combined boats and trailers eliminate the need for the separate land trailer, saving storage and parking space and potentially saving time in entering and leaving the water. Nevertheless, they do not provide independent access to areas other than moderately deep waters, and they offer no utility on ice.

A large variety of amphibious vehicles have also been devised. Exemplary patents that further incorporate hydraulic drive components, the teachings and contents of each which are incorporated herein by reference, include U.S. Pat. No. 3,487,802 by Roy, entitled "Amphibious boat"; U.S. Pat. No. 3,755,835 by Boersig, entitled "Wheeled boat"; U.S. Pat. No. 5,181,478 by Berardi, entitled "Amphibious vehicle with retractable wheels"; U.S. Pat. No. 5,632,221 by Trenne et al, entitled "Amphibious vehicle having retractable ground wheels"; U.S. Pat. No. 6,921,304 by Hewitt, entitled "Amphibious vehicle"; U.S. Pat. No. 7,004,801 by Bryham, entitled "Amphibious vehicle"; and U.S. Pat. No. 7,934,963 by Carambat, entitled "Amphibious vehicle". These vehicles greatly expand the possibilities for traversing very diverse land and water surfaces, while offering generally good combinations of benefits and relatively few limitations. While these vehicles can greatly expand the accessible areas and reduce the inconveniences of storage and loading and unloading of trailers, they again suffer from undesirable limitations when used upon ice. For example, some of the vehicles are complex and heavy, and so cannot easily traverse thinner ice. If they break through, they do not have the means for propelling through the ice or climbing out therefrom, meaning the vehicle becomes dangerously trapped. Others of these amphibious vehicles simply do not provide features best suited for recreation upon the ice, as will be better understood from contrasting with the present invention. Consequently, to access frozen lakes, rivers, and streams, most people currently rely upon other types of vehicles, such as snowmobiles, All-Terrain Vehicles (ATVs), and even automobiles.

In addition to the aforementioned hydraulic drive systems, other power systems may be preferable for particular applications. One of these is a human-powered or power-assisted drive, such as provided by a pedal drive coupling. For exemplary purposes, and not solely limited thereto, when a boat is in very shallow water, particularly with shallow weeds, a typical motor-driven propeller will spin at such a great RPM that the propeller will quickly become thoroughly weed-wrapped. Further, where only small or relatively minor maneuvers are intended, starting and stopping a relatively large engine is both inefficient, costly, and unpleasant, both due to noise or auditory volume and also engine exhaust. There are many situations where a slight amount of repositioning would be highly desirable, and the larger engine is not necessary. In addition, an alternative power system, particularly a human-powered or human-power-assisted drive can be used both for simple or quiet movement, and also in emergency situations as a back-up or redundant system to the main drive system. Exemplary patents that incorporate dual power, including pedal and electric drive systems, the teachings and contents of each which are incorporated herein by reference, include U.S. Pat. No. 7,549,902 by Jansen, entitled "Electric motor assisted propulsion system for human-powered watercraft"; U.S. Pat. No. 7,591,202 by Grube, entitled "Gear box power control system for a small gasoline engine"; 2008/0071436 by Dube et al, entitled "Energy management system for motor-assisted user-propelled vehicles"; 2008/0200079 by Jansen, entitled "Separated electric motor assisted propulsion for human-powered watercraft"; 2011/0180341 by Chan, entitled "Pedal driven apparatus having a motor"; and 2011/0183805 by Chan, entitled "Motor having integrated torque sensor". Other exemplary dual power watercraft, the teachings and contents of each which are incorporated herein by reference, include U.S. Pat. No. 2,504,833 by Hann, entitled "Internal-combustion outboard motor having auxiliary electric motor for starting and trolling"; and U.S. Pat. No. 7,207,852 by Myers, entitled "Ship propulsion arrangement".

Exemplary patents that illustrate solely pedal-powered watercraft, the teachings and contents of each which are incorporated herein by reference, include U.S. Pat. No. 4,891,024 by Benjamin, entitled "Pedal boat propulsion system"; U.S. Pat. No. 4,943,251 by Lerach et al, entitled "Pedal operated outboard motor for watercraft". Additional patents that illustrate pedal systems, the teachings and contents of each which are incorporated herein by reference, include U.S. Pat. No. 2,664,064 by Prenosil, Sr., entitled "Manually operated boat propelling mechanism"; U.S. Pat. No. 2,910,035 by Johnson, entitled "Foot operated marine paddle wheel system"; U.S. Pat. No. 3,039,422 by Baker, entitled "Pedal operated paddle system for boats"; U.S. Pat. No. 3,377,976 by Gustine, entitled "Propelling attachment for a boat"; U.S. Pat. No. 4,496,325 by Tweg, entitled "Collapsible paddle boat"; U.S. Pat. No. 6,165,030 by Lewis, entitled "Pedal driven propulsion device"; U.S. Pat. No. 6,210,242 by Howard et al, entitled "Pedal-powered watercraft"; U.S. Pat. No. 6,217,398 by Davis, entitled "Human-powered or human-assisted energy generation and transmission system with energy storage means and improved efficiency"; U.S. Pat. No. 6,712,653 by Free, entitled "Self-tensioning pedal drive mechanism for a human powered boat"; and U.S. Pat. No. 7,037,149 by Mauzy, entitled "Pedal powered catamaran".

Other documents, the teachings and contents which are incorporated by reference, include U.S. Pat. No. 2,823,684 by Sartori, entitled "Canopy for boats"; and U.S. Pat. No. 5,515,805 by Johanson, entitled "Folding boat and trailer".

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a multi-purpose boat operative upon hard surfaces and in water. A boat hull defines a substantially water impervious barrier between an operatively occupied boat interior and water when the boat traverses water. At least three retractable wheels are operative in a first extended position to support the boat hull above and distal to hard surfaces when the boat traverses these hard surfaces, and are operative in a second retracted position to position the boat hull immediately adjacent to these hard surfaces. At least one propeller operatively rotates and thereby propels the boat hull through water. At least one drive motor operatively propels the boat hull through at least one of the at least three retractable wheels and the at least one propeller. At least one ice fishing portal is operative in a first open position to permit ice fishing access through the boat hull, and is operative in a second closed position to maintain the boat hull substantially water impervious. The at least one ice fishing portal is operatively immediately adjacent to an ice surface when the at least three retractable wheels are in the second retracted position.

In a second manifestation, the invention is a boat operative for a variety of purposes including boating, land travel and ice fishing. The boat hull has a bottom and side walls. At least three retractable wheels are operative in a first extended position to support the boat hull bottom above and distal to ice when the boat traverses ice, and are operative in a second retracted position to position the boat hull bottom immediately adjacent to the ice. At least one propeller operatively rotates and thereby propels the boat hull through water. At least one drive motor operatively propels the boat hull, selectively and alternatively through at least one of the at least three retractable wheels and the at least one propeller. At least one ice fishing portal is operative in a first open position to permit ice fishing access through the boat hull and is operative in a second closed position to maintain the boat hull substantially water impervious. The at least one ice fishing portal is operatively immediately adjacent to the ice when the at least three retractable wheels are in the second retracted position. At least one seat is located adjacent to the at least one ice fishing portal upon which a person may operatively sit and fish through the at least one ice fishing portal when the at least three retractable wheels are in the second retracted position.

In a third manifestation, the invention is an amphibious vehicle operative for a variety of purposes including boating, land travel and ice fishing. A boat hull has a bottom and side walls and thereby defines a boat interior. A canopy selectively covers and shelters the boat interior. Retractable wheels are operative in a first extended position to support the boat hull bottom above and distal to ice when the boat traverses ice, and are operative in a second retracted position to position the boat hull bottom immediately adjacent to the ice. At least one propeller operatively rotates and thereby propels the boat hull through water. At least one drive motor has at least two alternative and independent motive power sources for operatively propelling the boat hull, selectively and alternatively through at least one of the retractable wheels and the at least one propeller. At least one ice fishing portal is operative in a first open position to permit ice fishing access through the boat hull and is operative in a second closed position to maintain the boat hull substantially water impervious. The at least one ice fishing portal is operatively immediately adjacent to the ice when the retractable wheels are in the second retracted position. At least one seat is adjacent to the at least one ice fishing portal upon which a person may operatively sit and fish through the at least one ice fishing portal when the retractable wheels are in the second retracted position.

OBJECTS OF THE INVENTION

Exemplary embodiments of the present invention solve inadequacies of the prior art by providing one or more portals along the bottom of an amphibious boat through which an ice fisherman may drill and access the water below the ice. The amphibious boat will preferably have a pivotal hitch, a plurality of alternative drive systems preferably including a human-powered alternative, and one or more suitable coverings or shelters coupled with the boat.

A first object of the invention is to provide a multi-purpose boat having expanded operation and capability. A second object of the invention is to facilitate the traversing and fishing of ice-covered bodies of water. Another object of the present invention is to reduce the time, effort and storage space required for using a boat.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides substantially expanded application and utility in the access and traversing of various land and waters, particularly including safe and ready access to ice covered bodies of water, and where desired, shelter therewith to improve the level of comfort and enjoyment.

Figure 1:
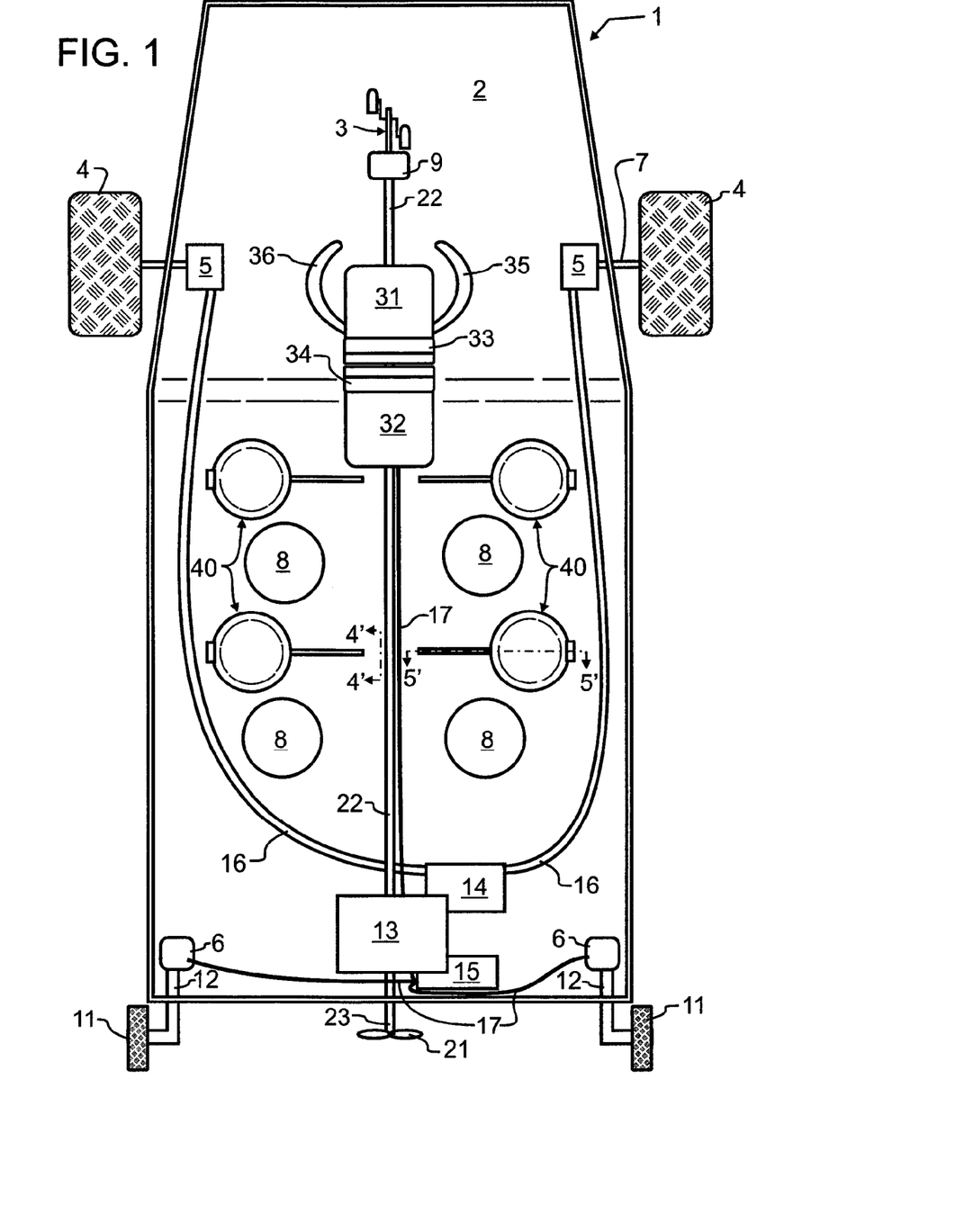
FIG. 1 illustrates a preferred embodiment multi-purpose boat designed in accord with the teachings of the present invention from a top plan view.

A preferred embodiment multi-purpose boat 1 is illustrated in FIG. 1 that has been designed in accord with the teachings of the present invention. A boat hull 2, the specific material and geometry which is not critical to the invention, provides the primary buoyancy in water. In the preferred embodiment illustrated in the Figures, boat hull 2 is a generally flat bottom boat with a small leading curve. This type of boat is known in the industry as a jon boat, which provides desirable close proximity with ice when used for ice fishing.

Most preferably, wherever objects pass through hull 2, appropriate seals or sealing material will be provided to substantially eliminate water infiltration. Furthermore, and although not illustrated but as known in the art of boats, optionally and where desired a bilge pump or the equivalent may be provided to drain out water from small leaks and precipitation, splash or spray that may collect within the boat.

While not essential to the present invention, preferred embodiment multi-purpose boat 1 is preferably provided with more than one source of motive power. Preferably, a set of pedals 3 are provided that are coupled through any suitable coupling such as chain and sprockets or belt and pulleys to a gear box such as worm gear box 9. Worm gear box 9 both changes the rate of rotation, and also preferably provides an angle conversion to convert the transverse axis rotation of pedals 3 to a rotation about a longitudinal axis along which drive shaft 22 may preferably be longitudinally aligned. The particular orientation of the shaft is not critical to the resent invention, and so, for exemplary purposes only and not solely limiting thereto, pedals 3 might in an alternative embodiment be shifted to the port or starboard from the center illustrated in FIG. 1. This could, if not otherwise compensated for, require drive shaft 22 to be longitudinally offset from the longitudinal axis of boat hull 2.

Drive shaft 22, and essentially all other components illustrated in the Figures, may be provided with a shroud, housing or other suitable container, shield or the like as desired without departing from the spirit of the invention. However, such features have been omitted from the present Figures to simplify the presentation of the components. Nevertheless, since drive shaft 22 is driven by pedals 3, the rotation thereof is expected to be relatively slow and without substantial force. Consequently, a separate shroud, tube or the like is not necessary, but optional.

Preferably, shaft 22 either adjacent to or at the coupling with motor 13 will be provided with a one-way clutch, such that pedals 3 will rotate drive shaft 22, but the operation of motor 13 will not rotate drive shaft 22 or pedals 3. Motor 13 may have any suitable source of energy, and so may for exemplary purposes be an electric, hydraulic, gasoline or other suitable motor. With appropriate clutches and other known power control components, motor 13 may also optionally drive hydraulic pump 14, or a separate suitable motor may be provided and dedicated for that purpose.

A small stub shaft 23 may be used to couple motor 13 to propeller 21. As illustrated, motor 13 is an inboard motor, but it will be apparent that with appropriate motor selection, the location of motor 13 is not critical to the invention, and so motor 13 may in an alternative embodiment be provided as an outboard motor. Likewise, while propeller 21 is illustrated outboard, propeller 21 may in an alternative embodiment be provided in a conduit or otherwise be partially enclosed or enshrouded, and could in a further alternative be arranged to act as a jet propeller or the like.

The set of pedals 3, worm gear box 9, drive shaft 22, motor 13, stub shaft 23, and propeller 21 together comprise a drive system operative to propel multi-purpose boat 1 when boat hull 2 is supported entirely in water. When multi-purpose boat 1 is instead traversing a shallow region such as river rapids, or traversing land, a second drive system will preferably be activated. Wheels 4 are coupled through stub shafts 7 to hydraulic drive motors 5. Hydraulic fluid preferably will be pumped by hydraulic pump 14 through suitable hydraulic line 16 to in turn cause hydraulic drive motors 5 to turn wheels 4. As noted above, hydraulic pump 14 will be powered either through a dedicated power source such as but not limited to an electric or gasoline motor, or may alternatively be driven by motor 13. Wheels 4 may also desirably be retractable, and if wheels 4 are both driven and retractable, then U.S. Pat. No. 5,632,221 by Trenne et al; and U.S. Pat. No. 7,004,801 by Bryham, each incorporated by reference herein above illustrate suitable constructions, the teachings which will be incorporated by those reasonably skilled in the art.

Figure 6:
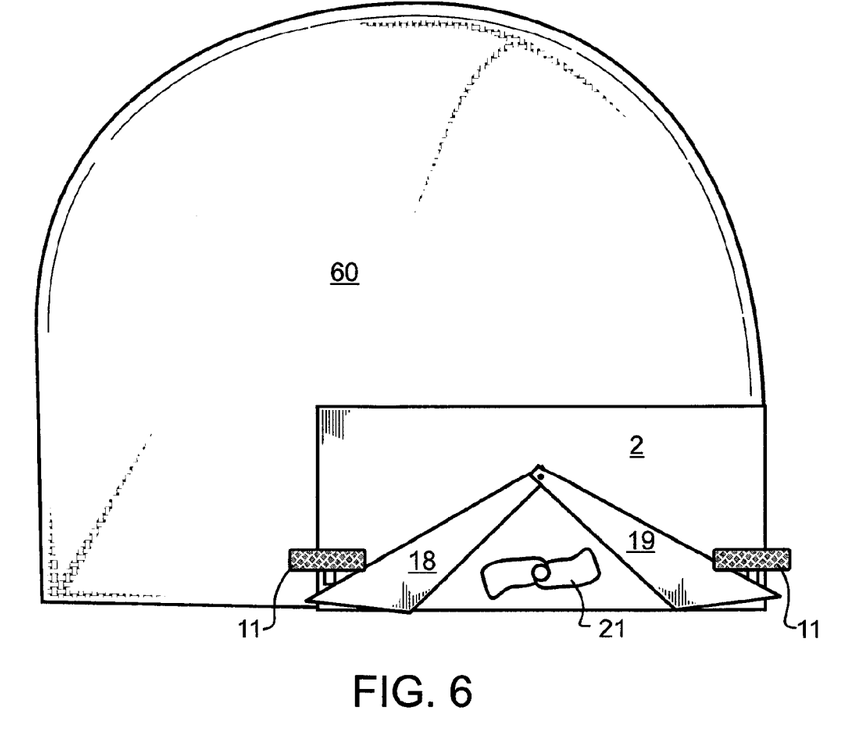
FIG. 6 illustrates one alternative embodiment multi-purpose boat having a tent-like covering in an open configuration and with the boat bottom lowered entirely onto a surface, such as a layer of ice, from an end elevational view.
Figure 7:
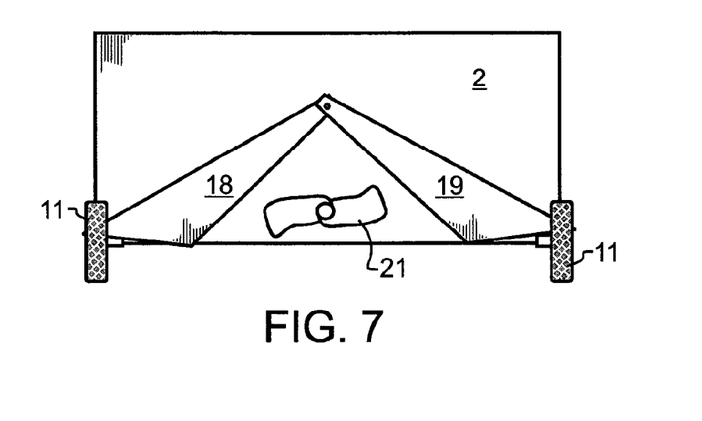
FIG. 7 illustrates the alternative embodiment of FIG. 6 in a land transport position from an end elevational view similar to that of FIG. 6.
Figure 8:
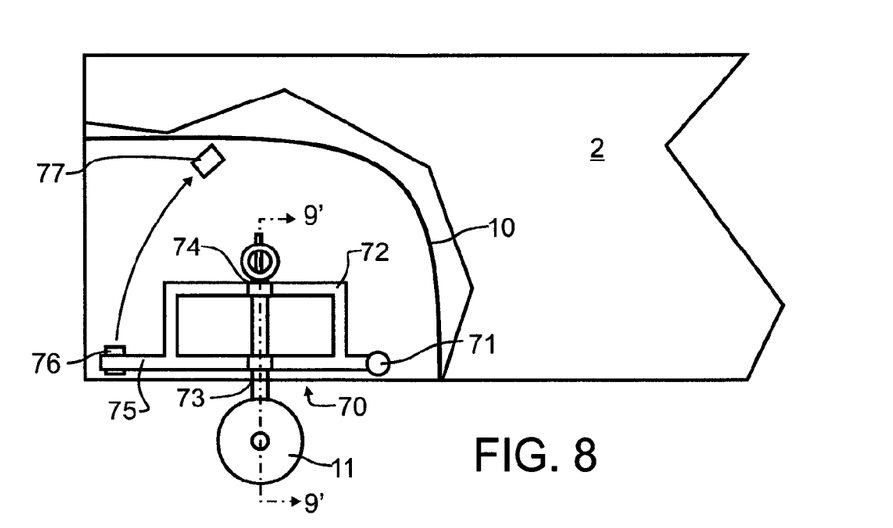
FIG. 8 illustrates an alternative embodiment two-axis pivotal rear wheel designed in accord with the teachings of the present invention from a side, partially sectioned view.
Figure 9:
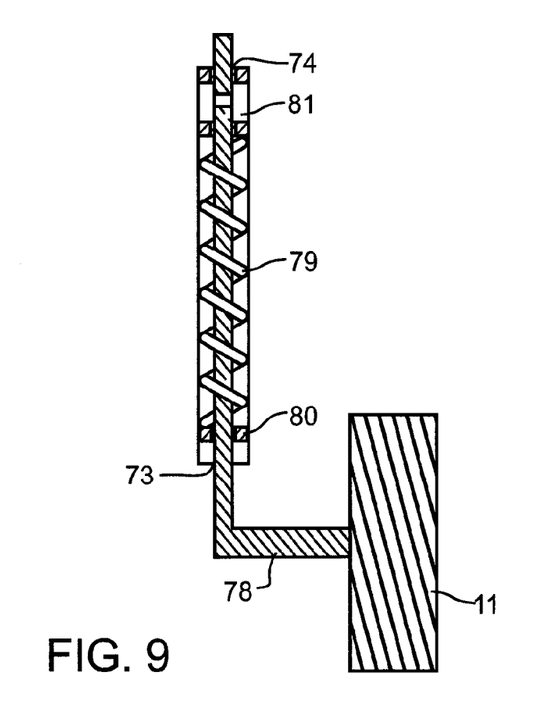
FIG. 9 illustrates the alternative embodiment two-axis pivotal rear wheel of FIG. 8 from a sectional view taken along line 9' in FIG. 8.
Figure 10:
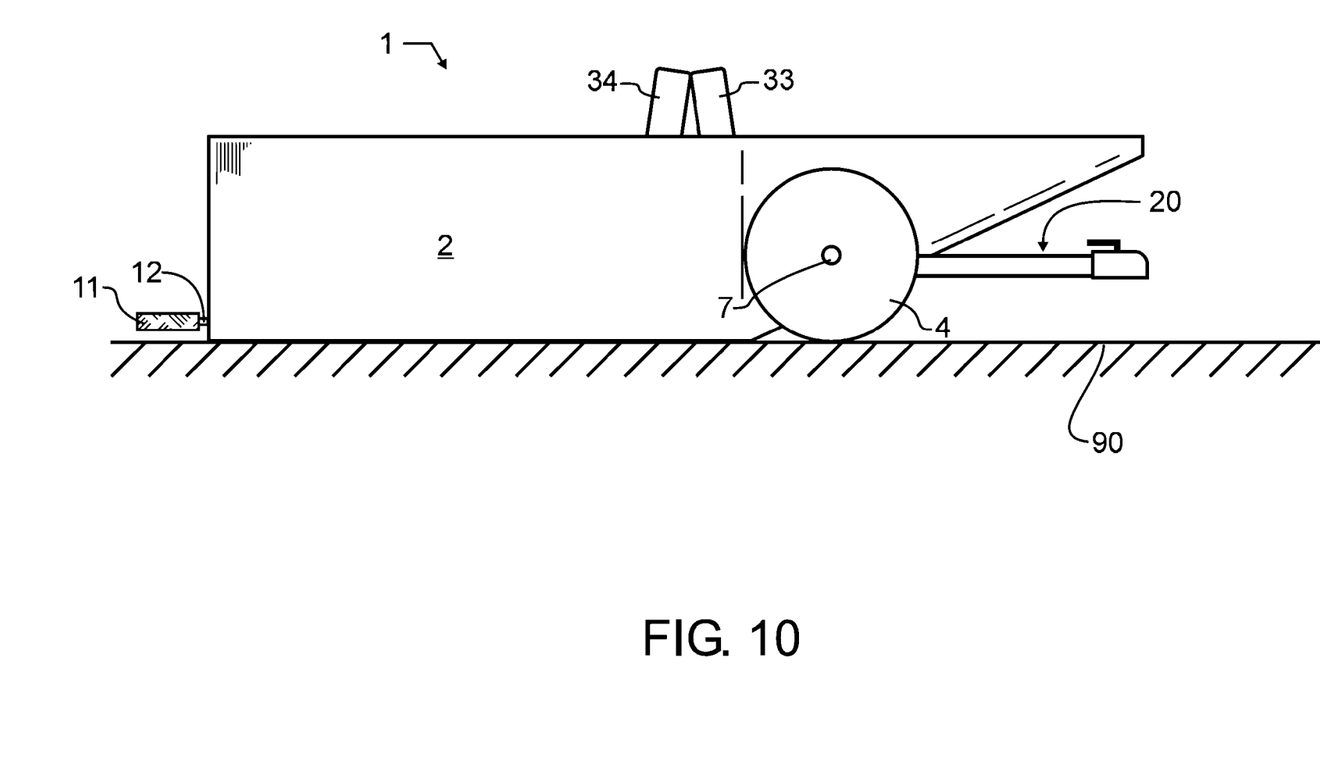
FIG. 10 illustrates the preferred embodiment multi-purpose boat of FIG. 2 from a side elevational view and with the wheels in a retracted position and the hull lowered onto an underlying hard surface.

A second set of wheels 11 are provided, and coupled through wheel shafts 12 to motion controls 6. Motion controls 6 may be electrical, hydraulic or other suitable apparatus. In the preferred embodiment, they are coupled through electrical or hydraulic lines 17 to rear wheel control 15. This control will preferably activate motion controls 6 to perform one of several desirable functions. One of these is a preferred ability to retract and extend wheels 11. FIG. 6 illustrates wheels 11 retracted, while FIG. 7 illustrates wheels in an active position. By retracting wheels 4 and 11 as illustrated in FIG. 10, hull 2 may be lowered onto an underlying hard surface 90 such as ice or the like. In the illustrated embodiment, retracting wheels 11 is achieved by rotation that is either generated or controlled by motion controls 16. Nevertheless, the motion does not have to be rotary about a longitudinal axis as illustrated in FIG. 6, and for exemplary purposes only could alternatively be rectilinear motion about a vertical axis, such as might be generated by rotation of a pinion gear or the like against a rack fixed to or formed within wheel shafts 12. With a vertical axis, wheels 11 may then be free to rotate entirely or through some arc about the vertical axis. In the preferred embodiment of FIG. 1, an electrical or hydraulic line 17 extends forward to seat 31, so that a boat operator manually or through automated control may initiate changes in position of wheels 11 as desired or required. An alternative embodiment rear retractable wheel assembly is also illustrated in FIGS. 8 and 9, and described in further detail herein below.

Directional control over land and through the water may be provided by any known and suitable apparatus. In the preferred embodiment, right and left steering arms 35 and 36, respectively, are provided and operate just as a zero-turn radius lawn mower or military tank. For exemplary purposes, pushing arm 35 forward from a neutral position might drive right front wheel 4 forward, and pulling back from the neutral position will instead drive right front wheel 4 in reverse. Similar motions are generated by movement of arm 36 that control left front wheel 4. Consequently, when right steering arm 35 is pushed forwards and left steering arm 36 is pulled backward by an equal and opposed amount, multi-purpose boat 1 will rotate in a counter-clockwise direction and preferably not travel either forward or backward. In this embodiment, the rear wheels 11 must spin about a vertical axis in order to follow the rotary motion of boat hull 2.

Throughout the steering and driving, an operator can be conveniently seated on seat 31, and back rest 33 may fold down. While the number and location of passenger seats is optional and will be determined by a boat designer taking into account the size of boat hull 2 and other known factors, in the embodiment illustrated a second seat 32 is provided that is rearward facing and that has a fold-down seat back 34. By providing two opposed seats, the present invention may optionally be used for hunting with two hunters facing in opposite directions. Further, with seat backs 33 and 34 folded down, a bed may be formed that can be used for sleeping, or for lay-down hunting such as is commonly practiced in hunting waterfowl and described in the patents incorporated herein above by reference. Four more seats 8 are shown somewhat schematically, the exact size and geometry of which is not critical to the invention. Preferably, adjacent to each seat 8 is an ice fishing portal 40, the operation which will be described in greater detail herein below with FIGS. 4 and 5.

Figure 2:
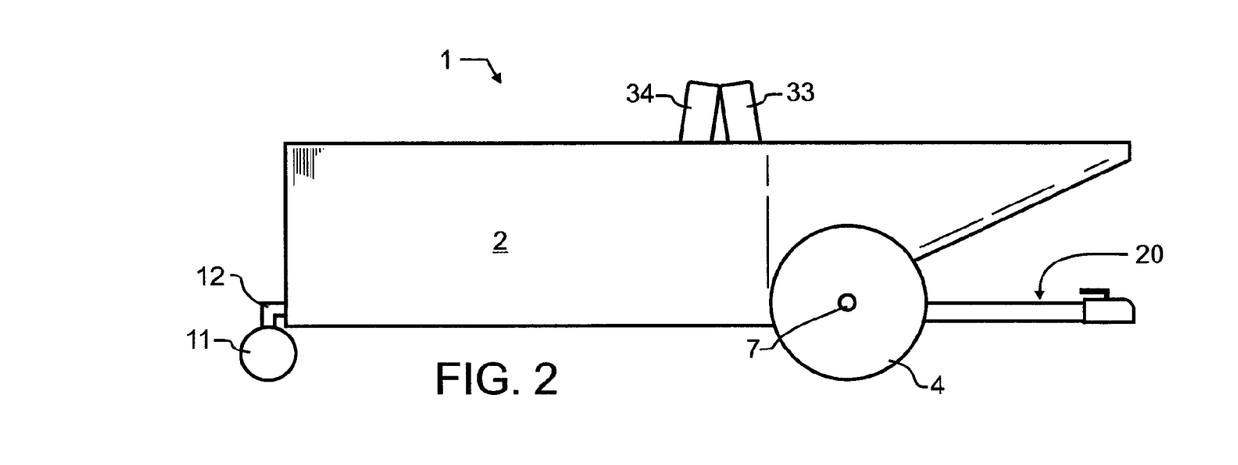
FIG. 2 illustrates the preferred embodiment multi-purpose boat of FIG. 1 from a side elevational view and with the hitch in a lowered and extended position suitable for trailering.
Figure 3:
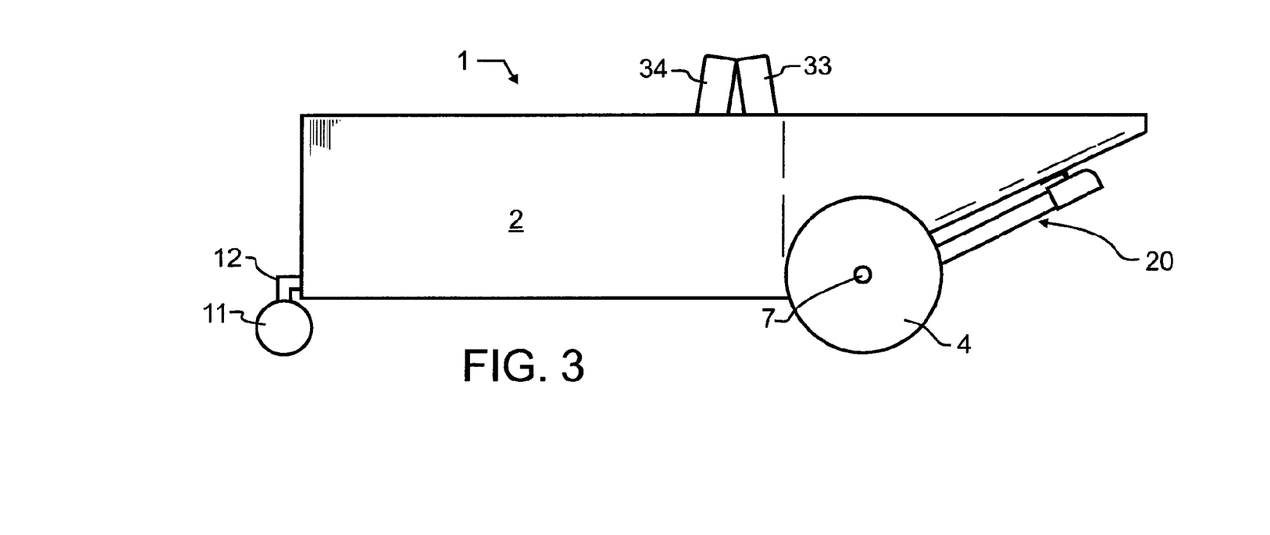
FIG. 3 illustrates the preferred embodiment multi-purpose boat of FIG. 1 from a side elevational view and with the hitch in a raised position suitable for boating and self-propelling.

FIGS. 2 and 3 illustrate the preferred embodiment multi-purpose boat 1 from a side elevational view, with hitch 20 in a lowered and extended position suitable for trailering in FIG. 2 and with hitch 20 in a raised position suitable for boating and self-propelling in FIG. 3. In one alternative embodiment, hitch 20 will be mechanically, electrically or otherwise coupled with wheels 11 to lock them into a longitudinally in-line orientation when hitch 20 is lowered, to improve the trailer behavior during towing.

Figure 4:
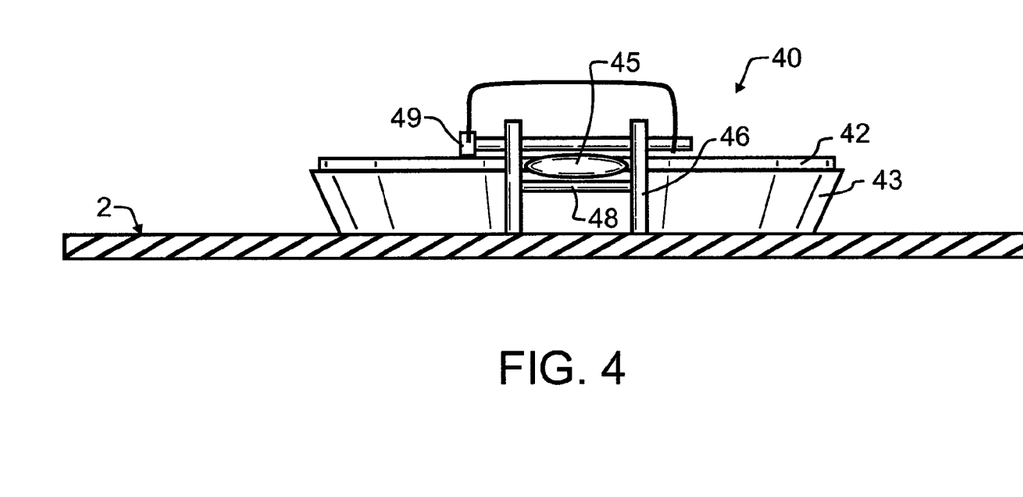
FIG. 4 illustrates a preferred embodiment portal designed in accord with the teachings of the present invention from a side elevational view, while sectioned through the boat bottom taken along section line 4' of FIG. 1.
Figure 5:
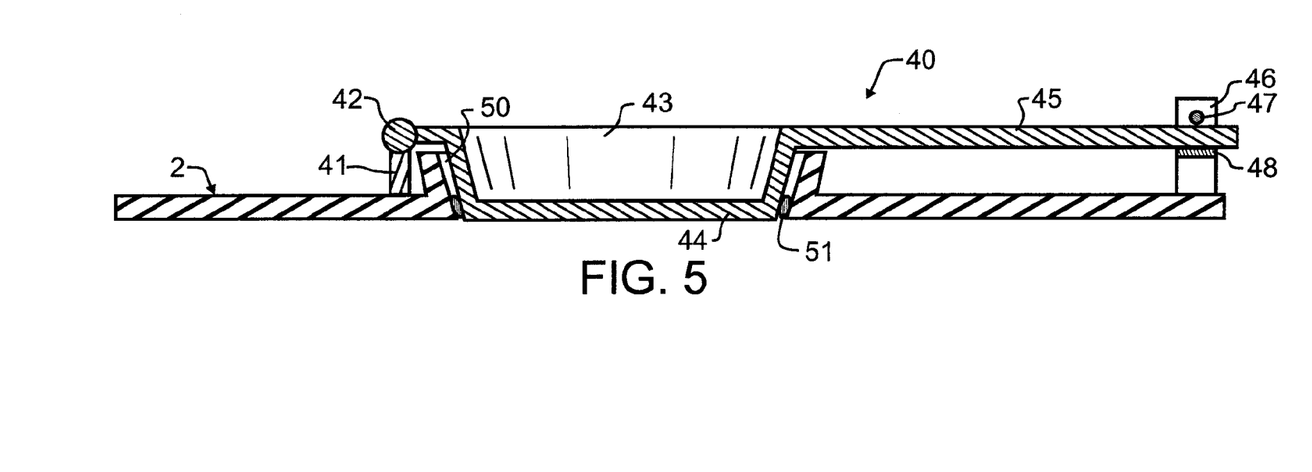
FIG. 5 illustrates the preferred embodiment portal of FIG. 4 from a side cross-sectional view taken along section line 5' of FIG. 1.

FIGS. 4 and 5 illustrate one preferred embodiment portal 40 designed in accord with the teachings of the present invention. As shown therein, a support 41 is rigidly affixed to boat hull 2 and rises therefrom. A hinge 42 rotationally couples a pot-shaped portal closure 43 having a generally planar bottom 44 thereto, such that portal closure 43 may be rotated to either open boat hull ice fishing opening 50 or close and seal opening 50. In the positions illustrated in FIGS. 4 and 5, ice fishing opening 50 is closed by portal closure 43 in association with an elastomeric or other suitable seal 51, to prevent water from seeping into the interior of hull 2. Preferably, bottom 44 will be co-planar with the bottom of boat hull 2, or close thereto, to prevent the undesirable generation of turbulence when multi-purpose boat 1 is being driven through the water. While there will be a number of suitable techniques to secure portal closure 43 in the closed position illustrated in the Figures, one such arrangement has been illustrated herein, though other suitable arrangements are known in the field of marine portals and are considered to be incorporated herein. As illustrated, a long handle 45 similar to a cooking pot handle extends from portal closure 43, which provides simple leverage and a place where a person may push or step to drive portal closure tightly into engagement with seal 51. A stop 48 prevents excessive compression, and a hasp or other locking pin 49 may be inserted through hole 47 to secure handle 45 in place. Opening ice fishing portal 40 is a simple process of removing pin 49 and allowing handle 45 to spring up slightly. Handle 45 may then be lifted, and pin 49 re-secured until needed again by passing through hole 47. Other known apparatus and geometries for securely closing and sealing portals are considered to be incorporated herein as well.

FIG. 6 illustrates one alternative embodiment multi-purpose boat having a tent-like covering 60 in an open configuration and with the boat bottom lowered entirely onto a surface, such as a layer of ice, from an end elevational view. As may be appreciated, when multi-purpose boat 1 is lowered onto the ice and one or more ice fishing portals 40 opened, shelter 60 provides protection from the elements that can bring welcome relief. Several patents illustrate pop-up tents or the like, the teachings which can provide desired capability, for exemplary purposes including U.S. Pat. No. 3,348,874 by Gorman, entitled "Combination boat-tent-trailer apparatus"; and U.S. Pat. No. 6,164,238 by Stokes, entitled "Lightweight folding boat with tent and trailer"; the teachings and contents of each which are incorporated by reference herein. As taught for exemplary purposes in the patents incorporated herein by reference, a fold-out tent like shelter 60 may then be deployed, and one or more persons may then more comfortably fish or hunt within multi-purpose boat 1. FIG. 7 illustrates the alternative embodiment of FIG. 6 in a land transport position.

Further capability may in some cases be desired and gained through the incorporation of a layout hunting blind into a multi-purpose boat designed in accord with the teachings of the present invention, suitable hunting blinds which for exemplary purposes only and not solely limiting thereto are illustrated in U.S. Pat. No. 583,033 by Danz, entitled "Hunting boat"; U.S. Pat. No. 3,638,257 by Ernst, entitled "Hunting boat"; U.S. Pat. No. 4,106,145 by Gillen et al, entitled "Boat mounted game blind"; U.S. Pat. No. 4,751,936 by Zibble et al, entitled "Portable field blind"; U.S. Pat. No. 5,477,875 by Daly, entitled "Means for and method of hunting waterfowl"; and U.S. Pat. No. 5,730,080 by Cripe, entitled "One person hunting blind"; U.S. Pat. No. 6,769,379 by Foiles, entitled "Boat blind"; the teachings and contents of each which are incorporated by reference herein.

FIG. 8 illustrates an alternative embodiment two-axis pivotal rear wheel 11 designed in accord with the teachings of the present invention. In this embodiment, a support frame 72 of any suitable geometry receives an axle shaft 78 passing through a pair of holes 73 and 74 formed in support frame 72. Support frame 72 is anchored on one end through a pivot 71 to boat hull 2. At the end 75 distal to pivot 71, a pin or other fastener is preferably used to anchor to either connector 76, which holds wheel 11 in a lowered, land-active position comparable to that of FIG. 7, or to connector 77, which lifts wheel 11 up into wheel well 10 and into a raised, land-inactive position comparable to that illustrated in FIG. 6. Support frame 72 pivots between these two positions of engagement, and must be pinned or otherwise fixed to one of the connectors 76, 77.

Captured between a washer 80 rigidly coupled to axle shaft 78 and support frame 72, and helically wrapped about axle shaft 78, is helically wound compression spring 79. When wheel 11 hits a bump or other irregularity, compression spring 79 is compressed and shortens, allowing wheel 11 to lift up over the bump without corresponding and equal motion being required in boat hull 2. When being driven on land, in the land-active position such as illustrated in FIG. 8, and with the zero-turning radius capability of the preferred embodiment, it is very desirable to allow tire 11 to spin freely about a vertical axis defined by the longitudinal axis of axle shaft 78. However, when hitch 20 is lowered into a trailering position, it is desirable to lock tire 11 into a direction of travel parallel to that of the longitudinal axis of hitch 20. This can be achieved by inserting a pin or hasp through hole 81 formed in support frame 72. A matching hole is formed through axle shaft 78, so that no rotation is possible between axle shaft 78 and support frame 72. Any other suitable known techniques of locking axle shaft 78 and support frame 72 together, with wheel 11 rolling in the desired direction, may be used and will be understood to be incorporated herein. While axle shaft 78 is illustrated in FIG. 9 as being "J"-shaped, it will be understood that axle 78 can in an alternative embodiment be a vertical shaft with wheel 11 centered therewith, in a manner similar to many caster wheels.

In addition to the foregoing descriptions of preferred and alternative embodiments, there are a number of other additional features and capabilities that may be desirable to incorporate into a multi-purpose boat in accord with the teachings of the present invention. Among these is the capability for steering control at low speeds, such as during pedaling or other gentle maneuvering, and preferably using various flaps and rudder mechanisms. This additional and optional feature is illustrated in FIGS. 6 and 7. Low speed rudders 18 and 19 may be provided, and if provided are preferably designed to pivot from a common point above propeller 21. These rudders 18 and 19 are preferably located between boat hull 2 and propeller 21, though the specific design is not critical. Suitable rudders may be designed either or both functionally and structurally to operate in a manner similar to that illustrated in the following exemplary U.S. patents, the teachings and contents of each which are incorporated herein by reference: U.S. Pat. No. 917,618 by Lacoste, entitled "Ship brake"; U.S. Pat. No. 1,164,817 by Hyde, entitled "Ship brake"; U.S. Pat. No. 2,214,655 by Briggs, entitled "Steering mechanism for vessels"; U.S. Pat. No. 2,994,290 by Merchant, Sr., entitled "Retractable drag device for boats"; U.S. Pat. No. 3,159,134 by Winnen, entitled "Slow speed steering control for jet propelled boats"; U.S. Pat. No. 4,776,295 by Kline et al, entitled "Boat flaps for controlling and steering a boat operating at low speeds"; and U.S. Pat. No. 5,813,357 by Watson, entitled "Jet ski steering and braking system".

Another capability that may reasonably be desired is access through the boat bottom, particularly when traversing frozen bodies of water, thereby permitting ice fishing from within the boat. In order to better facilitate an understanding of various components that may be alternatives to those described herein below and that may therefore be useful herein, the present disclosure additionally incorporates herein by reference the following exemplary patents: U.S. Pat. No. 906,261 by Morzinski, entitled "Rowboat"; U.S. Pat. No. 2,473,076 by Scheibner, entitled "Collapsible structure for ice fishing"; U.S. Pat. No. 4,494,472 by Rougerie, entitled "Floating and nonsubmersible nautical craft"; U.S. Pat. No. 4,844,595 by Nealy, entitled "Viewing device for flotation body"; U.S. Pat. No. 5,010,835 by Kunitake et al, entitled "Semi-submerged glass boat"; U.S. Pat. No. 6,241,569 by Harkrider, entitled "Sea windows for rafts"; U.S. Pat. No. 6,302,043 by Wippermann, entitled "Discovery boat"; U.S. Pat. No. 7,487,734 by Davis, entitled "Convertible multipurpose recreational assembly"; and U.S. Pat. No. 7,927,164 by Kuchler, entitled "Underwater viewing unit for an air mattress".

Additional capability may optionally be gained through the incorporation of one or more self-pounding or otherwise suitable stakes, which for exemplary purposes are illustrated in U.S. Pat. No. 5,085,281 by Selly, entitled "Slide hammer apparatus"; and U.S. Pat. No. 6,374,529 by Petroski et al, entitled "Pulley action decoy system"; the teachings and contents of each which are incorporated by reference herein. Such stakes can, for exemplary purposes and in accord with the teachings of the present invention, be used to moor a multi-purpose boat 1 designed in accord with the teachings of the present invention or to assist with the landing and launching of the same.

While the foregoing details what is felt to be the preferred embodiment of the invention, no material limitations to the scope of the claimed invention are intended. Further, features and design alternatives that would be obvious to one of ordinary skill in the art are considered to be incorporated herein. As described throughout the present specification, a wide variety of alternatives have been incorporated by reference herein above for the express purpose of illustrating a sampling of these alternatives, without limiting the present invention solely thereto. Instead, the scope of the invention is set forth and particularly described in the claims herein below.

I claim:

1. A multi-purpose boat operative upon hard surfaces and in water, comprising:
   a boat hull defining a substantially water impervious barrier between an operatively occupied boat interior and said water when said boat traverses said water;
   at least three retractable wheels operative in a first extended position to support said boat hull above and distal to said hard surfaces when said boat traverses said hard surfaces, and operative in a second retracted position to position said boat hull on to said hard surfaces;
   at least one propeller operatively rotating and thereby propelling said boat hull through said water;
   at least one drive motor for operatively propelling said boat hull through at least one of said at least three retractable wheels and said at least one propeller;
   at least one ice fishing portal operative in a first open position to permit ice fishing access through said boat hull and operative in a second closed position to maintain said boat hull substantially water impervious, said at least one ice fishing portal coplanar with a bottom of said boat hull and thereby on an ice surface when said at least three retractable wheels are in said second retracted position above said ice surface.

2. The multi-purpose boat of claim 1, further comprising at least one seat adjacent to said at least one ice fishing portal upon which a person may operatively sit and fish through said at least one ice fishing portal when said at least three retractable wheels are in said second retracted position.

3. The multi-purpose boat of claim 1, further comprising a canopy selectively covering and sheltering said boat interior.

4. The multi-purpose boat of claim 1, wherein said at least one drive motor further comprises at least two independent motive power sources.

5. The multi-purpose boat of claim 1, further comprising a pair of opposed seats each having fold-down back rests and thereby convertible to a bed.

6. The multi-purpose boat of claim 1, wherein said at least one ice fishing portal further comprises:
   a hole through said boat hull;
   a hinge rigidly affixed to said boat hull;
   a portal cover coupled to said hinge and thereby rotatable relative to said boat hole; and
   a fastener operative to selectively secure said portal cover to said boat hull and thereby close said boat hull hole.

7. The multi-purpose boat of claim 6, wherein said portal cover further comprises side walls and a bottom, said bottom co-planar with said boat hull bottom when said portal cover is selectively secured to said boat hull.

8. A boat configured for a variety of purposes including boating, land travel and ice fishing, comprising:
- a boat hull having a bottom and side walls;
- at least three retractable wheels configured in a first extended position to support said boat hull bottom above and distal to ice when said boat traverses said ice, and configured in a second retracted position to position said boat hull bottom immediately adjacent to said ice;
- at least one propeller operatively rotating and thereby propelling said boat hull through said water;
- at least one drive motor configured to propel said boat hull, selectively and alternatively through at least one of said at least three retractable wheels and said at least one propeller;
- at least one ice fishing portal configured in a first open position to permit ice fishing access through said boat hull and configured in a second closed position to maintain said boat hull substantially water impervious, said at least one ice fishing portal operatively immediately adjacent to said ice when said at least three retractable wheels are in said second retracted position; and
- at least one seat adjacent to said at least one ice fishing portal upon which a person may operatively sit and fish through said at least one ice fishing portal when said at least three retractable wheels are in said second retracted position.

9. The boat of claim 8, further comprising a canopy selectively covering and sheltering said boat interior.

10. The boat of claim 8, wherein said at least one drive motor further comprises at least two independent motive power sources.

11. The boat of claim 8, further comprising a pair of opposed seats each having fold-down back rests and thereby convertible to a bed.

12. The boat of claim 8, wherein said at least one ice fishing portal further comprises:
- a hole through said boat hull;
- a hinge rigidly affixed to said boat hull;
- a portal cover coupled to said hinge and thereby rotatable relative to said boat hole; and
- a fastener configured to selectively secure said portal cover to said boat hull and thereby close said boat hull hole.

13. The boat of claim 12, wherein said portal cover further comprises side walls and a bottom, said bottom co-planar with said boat hull bottom when said portal cover is selectively secured to said boat hull.

14. An amphibious vehicle operative for a variety of purposes including boating, land travel and ice fishing, comprising:
- a boat hull having a bottom and side walls and thereby defining a boat interior;
- a canopy selectively covering and sheltering said boat interior;
- retractable wheels operative in a first extended position to support said boat hull bottom above and distal to ice when said boat traverses said ice, and operative in a second retracted position to position said boat hull bottom immediately adjacent to said ice;
- at least one propeller operatively rotating and thereby propelling said boat hull through said water;
- at least one drive motor having at least two alternative and independent motive power sources for operatively propelling said boat hull, selectively and alternatively through at least one of said retractable wheels and said at least one propeller;
- at least one ice fishing portal operative in a first open position to permit ice fishing access through said boat hull and operative in a second closed position to maintain said boat hull substantially water impervious, said at least one ice fishing portal operatively immediately adjacent to said ice when said retractable wheels are in said second retracted position; and
- at least one seat adjacent to said at least one ice fishing portal upon which a person may operatively sit and fish through said at least one ice fishing portal when said retractable wheels are in said second retracted position.

15. The amphibious vehicle of claim 14, wherein said at least one ice fishing portal further comprises:
- a hole through said boat hull;
- a hinge rigidly affixed to said boat hull;
- a portal cover coupled to said hinge and thereby rotatable relative to said boat hole; and
- a fastener operative to selectively secure said portal cover to said boat hull and thereby close said boat hull hole.

16. The amphibious vehicle of claim 15, wherein said portal cover further comprises:
- side walls;
- a bottom co-planar with said boat hull when said portal cover is selectively secured to said boat hull;
- a handle extending radially out from said side walls;
- an elastomeric seal lining said boat hull hole and operative to engage with said side walls to form a substantially water-impervious seal therewith; and
- a fastener securing said handle to said boat hull when said portal cover is selectively secured to said boat hull.

* * * * *